D. Lane,

Saw-Mill Head-Block.

No. 2,872. Reissued Feb. 18, 1868.

Witnesses:
J. W. Coombs.
Geo. Tusch

Inventor:
Dennis Lane
per Munn & Co.
Attorneys.

N. PETERS, PHOTO-LITHOGRAPHER, WASHINGTON, D. C.

UNITED STATES PATENT OFFICE.

DENNIS LANE, OF MONTPELIER, VERMONT.

IMPROVEMENT IN HEAD-BLOCKS FOR SAW-MILLS.

Specification forming part of Letters Patent No. 1,770, dated July 9, 1861; Reissue No. 2,872, dated February 18, 1868.

*To all whom it may concern:*

Be it known that I, DENNIS LANE, now of Montpelier, but formerly of Plainfield, in the county of Washington and State of Vermont, have invented a new and Improved Log-Setting Device for Saw-Mills; and I do declare that the following is a full, clear, and exact description of the same, reference being had to the accompanying drawings, forming a part of this specification, in which—

Figure 1:
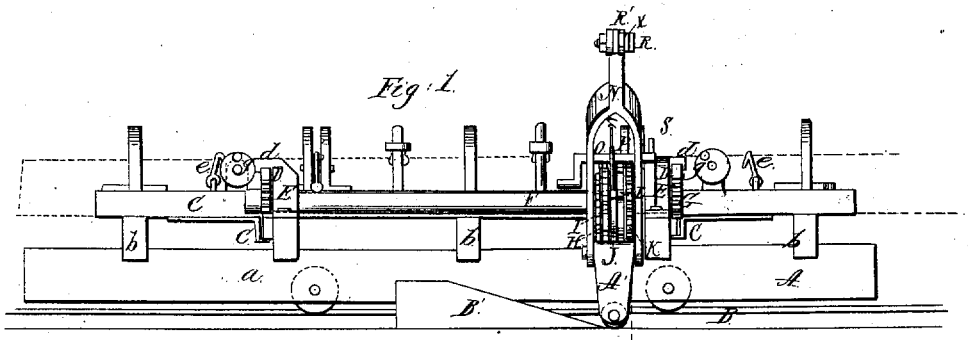
Figure 2:
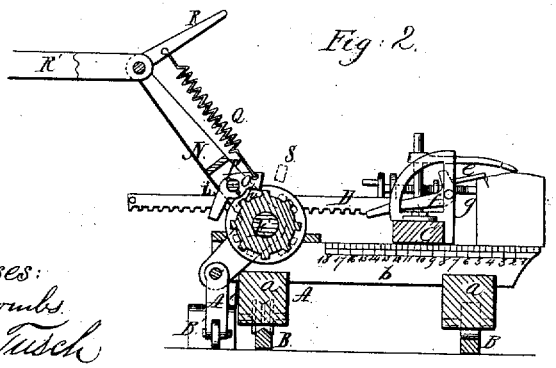

Figure 1 is a side view of my invention; Fig. 2, a transverse vertical section of the same, taken on line *x x* of Fig. 1; and Fig. 3, a plan or top view of the same.

Similar letters of reference indicate like parts.

The object of this invention is to obtain a means for setting the carriages of saw-mills which will admit of a single attendant adjusting the log to the saw and also operating the brakes for feeding and gigging back the carriage.

The invention also has for its object the ready adapting of the parts for adjusting the log to saw-boards of different thicknesses, as hereinafter described.

It is further designed to provide the slide or bar of the carriage, by means of which the log is set up upon the carriage to the saw, with a series of bearing-points or rests at suitable distances apart, that are sufficiently projected therefrom to accommodate whatever knots or other irregularities or protuberances there may be in the log, and also sufficiently extended above the said setting-up bar or slide to the carriage for affording the necessary side rest or bearing for any thickness of log, however much in excess of the thickness of the bar or slide, these side bearings or rests for the logs being of sufficient number to afford the side support desired to the log, whether long or short; and the invention also has for its object the providing of the setting-up bar or slide of the carriage with a dog or dogs, for so securing a log or logs or plank to the carriage while being split or edged that, while not entering the wood, or, if at all, not to such an extent as to impair or injure the same, the logs or plank will be firmly held from being sprung or tipped by the action of the saw, which with the common dogs heretofore used is likely to and does occur, whether the said logs or plank are projected more or less over the end of the head-blocks or cross-trees of the carriage on which the setting-up bar or slide moves; and this invention has for its object to provide one or more of the side rests or bearings of the setting-up bar or slide to the carriage for the log with such means or devices as will enable one or more of the said side bearings to be thrown out either more or less from the setting-up slide or bar, according as it may be desired or found necessary for the proper adjustment of a log on the carriage for being sawed; and, finally, this invention consists in providing the carriage with a connection between the devices thereof for setting up the log and a stationary incline upon the floor or other stationary part of the mill, that as the carriage moves the setting-up devices will be automatically operated.

A represents the log-carriage of a saw-mill; B B, the ways or guides on which it is placed and allowed to work freely. The carriage A is formed of two parallel bars, *a a*, connected by cross-ties *b b*.

C is the setting-up bar or slide, made of wood or other suitable material, and placed on the cross-bars *b b* parallel, or nearly so, with the bars *a a*. This bar C is allowed to work freely on the cross-ties *b b*, and it is kept in position by guides *c c*. (Shown in Fig. 1.)

To the bar C two racks, D D, are attached at right angles. These racks pass through guides *d d*, which are at the upper parts of the bearings E E of a shaft, F, which shaft has a pinion, G, at each end, the pinions gearing into the racks D D.

On the bar C there are placed the usual dogs, *e e*, also screws *g g*, for securing the log to the bar C, and also uprights $A^2$, at various points of its length, that are projected from the edge of the bar, and thus, while forming side rests or beams to the log, at the same time accommodate any knots, &c., in the log placed on the carriage along the bar C, and are sufficiently extended above the bar for any thickness of log, whether more or less, greater than the bar. These uprights $A^2$ are to be sufficient in number to afford a side support to logs of varying lengths, to prevent the log, when somewhat thinned or sawed away, from springing while being finished up.

*l l* are dogs arranged to slide up and down upon the posts *k k* of the bar C, which dogs *l*

*l* are provided for holding down and securing a log or logs or plank while being edged or split, they operating, as is obvious, to prevent all possibility of tipping or inclining by the action of the saw, however much the plank may be projected over the head-block or cross-ties of the carriage.

On the shaft F there are placed side by side a series of ratchets, H I J K, the teeth of which are placed at different distances apart—that is to say, some have more teeth than others, and no two have precisely the same number of teeth. On the shaft F there is also placed a ratchet, L, into which a retaining-pawl, M, catches.

Figure 3:
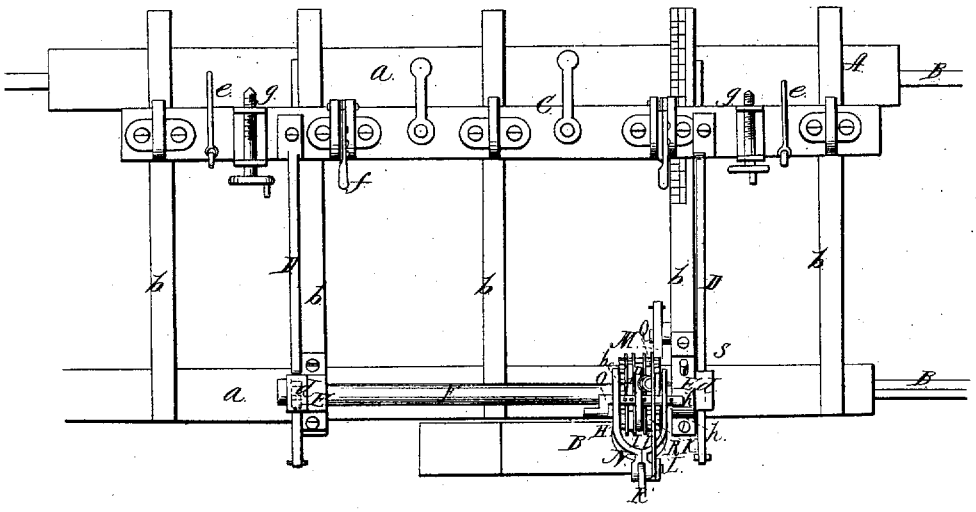

N is a forked lever, which is fitted on the shaft F, the forked end of the lever embracing the ratchets, as shown clearly in Figs. 1 and 3. In the forked part of the lever N there is fitted transversely a rod, O, on which a dog, P, is placed loosely. This dog P is allowed to slide on rod O, and it may be adjusted so as to engage with any of the ratchets H I J K, the dog being retained in proper position by means of pins *h* on the rod O. When the rod O is turned so that the pins *h* will be at the upper side of the rod, the dog P may be shoved along on the rod, owing to a slot, *i*, being made in the dog. (See Fig. 2.) The dog P is connected by a spiral spring, Q, with a lever, R, attached to the outer end of the forked lever N. A lever, R′, is also attached to the outer end of the forked lever N.

S is a pin or stop attached to the bearing E, adjoining the ratchets. This stop S determines the length of the inward movement of the lever N.

From the above description it will be seen that the bar C may be moved laterally on the carriage A by actuating the forked lever N, the dog P engaging with one of the ratchets H, I, J, or K, and thereby turning the shaft F, the pinions G of which move the racks D. This movement of bar C sets the log (shown in red in Figs. 1 and 2) to the saw; and the movement of bar C may be varied as desired by setting the dog P in different ratchets. The greater the number of teeth in the ratchet the less the movement of the bar C, and vice versa. The log therefore may be sawed into boards of varying thicknesses, as may be required. The dog P may be freed from any of the ratchets by simply raising the lever P. The bar C may be moved or adjusted backward to its original position at any time by lifting dog P, disengaging pawl M, and shoving the bar C back. A′ is a pendant attached to the lever N, and provided with a friction-roller, *d*, in its lower end, by which it passes up over an inclined bar or plane, B′, as the carriage moves, and thus produces an automatic operation of the setting-up devices through the lever N. In different lengths of log the position of the incline B′ is to be changed.

In the drawings two of the uprights $A^2$ constituting the side rests or bearings for the log on the carriage are shown as provided with means by which the projection of such side rests beyond the edge of the setting-up bar or slide C can be adjusted according as may be found necessary for the proper adjustment of the log in the carriage to be sawed. This means in the present instance consists of an angular lever, *f*, hung upon a fulcrum in the uprights $A^2$, and in such a position that by raising or lowering the handle end thereto the opposite end thereof can be made to project either more or less from the face of the uprights $A^2$, and thus to set off the log on the carriage therefrom, the said lever being held in such adjusted position by interlocking it with the proper notch, *f′*, of the series of notches *f′* in the uprights $A^2$.

Having thus described my invention, what I claim as new, and desire to secure by Letters Patent, is—

1. The employment or use of the ratchets H I J K, having teeth at different distances apart, in connection with the adjustable dog P, placed on the rod O, which is provided with retaining-pins *h*, the ratchets being placed on the shaft F, having pinions G G at its ends, which gear into racks D D, attached to bar C, all being arranged as and for the purpose set forth.

2. The bar C, provided with supports $A^2$, dogs *l l* on fixed posts *k k*, dogs *e e*, and lever-cams *f*, when the parts are constructed and arranged relatively with each other and operated in the manner and for the purposes substantially as described.

The above specification of my invention signed by me this 4th day of October, 1867.

DENNIS LANE.

Witnesses:
WM. F. MCNAMARA,
ALBERT W. BROWN.